(12) United States Patent
Reichel et al.

(10) Patent No.: US 7,204,494 B2
(45) Date of Patent: Apr. 17, 2007

(54) SPLIT STABILIZER AND PROCESS FOR ESTABLISHING A TOOTHED CONNECTION OF THE OUTER ROTARY PART TO ONE OF THE TWO STABILIZER PARTS

(75) Inventors: Klaus Reichel, Domsühl (DE); Torsten Baustian, Crivitz (DE); Winfried Krüger, Crivitz (DE); Stefan Beetz, Barnim (DE); Christian Klasen, Schwerin (DE); Jochen Peters, Parchim (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 10/848,706

(22) Filed: May 19, 2004

(65) Prior Publication Data

US 2005/0029722 A1 Feb. 10, 2005

Related U.S. Application Data

(63) Continuation of application No. PCT/DE03/01804, filed on Jun. 2, 2003.

(30) Foreign Application Priority Data

Jun. 6, 2002 (DE) .................... 102 25 035

(51) Int. Cl.
*B60G 21/055* (2006.01)
(52) U.S. Cl. ................ 280/5.506; 280/5.511; 280/124.107
(58) Field of Classification Search ........... 280/5.506, 280/124.106, 124.107, 124.152, 5.511; 267/188
See application file for complete search history.

(56) References Cited

U.S. PATENT DOCUMENTS

| | | | | |
|---|---|---|---|---|
| 2,161,138 A | * | 6/1939 | Cutting | 464/183 |
| RE27,068 E | * | 2/1971 | Groves et al. | 464/162 |
| 3,770,087 A | * | 11/1973 | Jaeschke | 192/18 B |
| 4,131,491 A | * | 12/1978 | Joseph | 148/537 |
| 4,526,628 A | * | 7/1985 | Ohno et al. | 148/520 |
| 4,919,444 A | * | 4/1990 | Leiber et al. | 280/5.511 |
| 5,448,944 A | * | 9/1995 | Line et al. | 100/88 |
| 5,491,996 A | | 2/1996 | Baarman et al. | |
| 5,527,061 A | | 6/1996 | Karl | |
| 5,647,683 A | * | 7/1997 | Easley | 403/359.6 |
| 5,700,027 A | | 12/1997 | Schiffler | |
| 5,791,444 A | * | 8/1998 | Schiffler | 188/293 |
| 6,375,895 B1 | * | 4/2002 | Daemen | 420/105 |
| 6,435,531 B1 | * | 8/2002 | Acker et al. | 280/124.107 |

(Continued)

FOREIGN PATENT DOCUMENTS

DE 1 179 124 10/1964

(Continued)

*Primary Examiner*—David R. Dunn
*Assistant Examiner*—Laura B. Rosenberg
(74) *Attorney, Agent, or Firm*—McGlew & Tuttle, PC

(57) ABSTRACT

A connection of the stabilizer parts of a two-part stabilizer to an actuator is usually performed in a positive-locking manner, as a result of which an additional axial securing and hydraulic sealing toward the outside become necessary. To simplify the design and the manufacturing process, it is provided that the teeth between the outer rotary part (4) and the second stabilizer part (2) be made clearance-free and welded together by a circumferential weld seam (18), wherein the seam area is preheated to a temperature of 350° C. and subsequently cooled to a martensite content of 30% in the microstructure.

14 Claims, 3 Drawing Sheets

U.S. PATENT DOCUMENTS

| | | | |
|---|---|---|---|
| 6,513,819 B1 * | 2/2003 | Oliver et al. | 280/124.152 |
| 6,634,078 B1 * | 10/2003 | Breese | 29/527.2 |
| 6,698,767 B2 * | 3/2004 | Hagan | 280/5.511 |
| 6,951,341 B1 * | 10/2005 | Beetz et al. | 280/5.511 |
| 2003/0137090 A1 | 7/2003 | Reichel et al. | |

FOREIGN PATENT DOCUMENTS

| | | |
|---|---|---|
| DE | 37 37 735 | 6/1988 |
| DE | 42 29 025 | 3/1994 |
| DE | 43 37 769 | 5/1995 |
| DE | 198 53 411 | 5/2000 |
| DE | 100 12 915 | 10/2001 |
| EP | 0 061 368 | 9/1982 |
| EP | 0 428 439 | 5/1991 |
| FR | 2 816 126 | 5/2002 |

* cited by examiner

SPLIT STABILIZER AND PROCESS FOR ESTABLISHING A TOOTHED CONNECTION OF THE OUTER ROTARY PART TO ONE OF THE TWO STABILIZER PARTS

CROSS REFERENCE TO RELATED APPLICATION

This is a continuation of and claims the benefit (35 U.S.C. §120 and 365(c)) of copending International Application PCT/DE 03/01804 of Jun. 2, 2003, which designated inter alia the United States and which claims the priority of German Application DE 102 25 035.9 of Jun. 6, 2002. The entire contents of each application is hereby incorporated by reference in its entirety.

FIELD OF THE INVENTION

The present invention pertains to a split stabilizer with a first stabilizer part and a second stabilizer part, the two being connected to one another by an actuator having an inner rotary part with at least one outwardly directed rotary wing and to a corresponding manufacturing process for establishing a toothed connection of the outer rotary part of an actuator with the second stabilizer part, wherein the rotary part is a case-hardened steel and the stabilizer part is a spring steel.

BACKGROUND OF THE INVENTION

Such stabilizers are used especially in automotive engineering.

One stabilizer, which operates according to the principle of a torsion bar and is directed in parallel to the vehicle axle, is associated, in principle, with each axle of a motor vehicle. The two ends of the stabilizer are fastened to the respective wheel suspension. This stabilizer prevents or substantially weakens the transmission of the rolling movements originating from the road conditions to the vehicle.

There are one-part stabilizers, which are designed for a predetermined spring rate only and therefore respond either too softly or too harshly to varying loads. They are therefore unsuitable for vehicles that are designed for both the road and terrain.

Vehicles that are subject to such loads are usually equipped with a split stabilizer. Such a split stabilizer is known, for example, from DE 100 12 915 A1, in which the two stabilizer parts are connected by an actuator in the form of a switchable coupling. This actuator comprises an outer rotary part, which is connected via a cover with one stabilizer part, rotating in unison therewith, and an inner rotary part, which is connected directly with the other stabilizer part, rotating in unison therewith. Both the inner rotary part with one stabilizer part and the cover of the outer rotary part with the other stabilizer part are made of one piece each.

This design solution leads to individual parts that are complicated in terms of manufacturing technology because the stabilizer part has a curved shape and a great length. The manufacturing technological difficulties are further increased, especially in the case of the stabilizer part with the cover, by the fact that the end of the complicated stabilizer part must be processed by forming to manufacture the cover.

DE 42 29 025 A1 describes a split stabilizer, whose stabilizer part with the cover of the outer rotary part is welded by a laser beam. Such a welded connection does not meet the requirements imposed on the strength for the transmission of the high and varying torques because the stabilizer part consists of spring steel and the cover of a case-hardened material and, in particular, spring steel is not considered to be weldable. The high welding temperatures lead to cracking during the phase of cooling.

In addition, laser beam welding is ruled out for cost reasons because a special laser welding machine with complicated devices becomes necessary for it.

A split stabilizer with an actuator, in which the cover of the outer rotary part has internal teeth and the corresponding stabilizer part has external teeth, is known from U.S. Pat. No. 5,700,027. Such teeth are, however, usually subject to a clearance due to the manufacturing technology, which is functionally manifested as a slip between the two rotary parts. To avoid this drawback, it is generally known to attach the cover with its internal teeth on the external teeth of the stabilizer part by kneading. Even though the clearance is thus eliminated, the load-bearing capacity of these teeth decreases in turn.

Such teeth are also not secured axially, so that a radial pin must be additionally inserted, and this pin further reduces the material thickness of the torque-transmitting parts, on the one hand, and is difficult to machine because of the high quality of the material, on the other hand, and it needlessly increases the manufacturing costs. Another drawback is that the teeth do not guarantee sealing toward the outside. Additional sealing elements, which seal the interior of the working chambers of the actuator toward the outside, are therefore necessary. This also makes the stabilizer more expensive.

SUMMARY OF THE INVENTION

The basic object of the present invention is therefore to simplify the design of the connection of the actuator to the corresponding stabilizer part. In terms of the process, the connection in question must be able to be established more simply and inexpensively compared with the prior-art manufacturing process.

According to the invention, a split stabilizer is provided comprising a first stabilizer part and a second stabilizer part, the two being connected to one another by an actuator. The actuator comprises an inner rotary part with at least one outwardly directed rotary wing and an outer rotary part with an equal number of inwardly directed rotary wings, which form free spaces between them for a coupling sleeve or hydraulic pressure spaces. The inner rotary part of the actuator is connected with the first stabilizer part, rotating in unison therewith, and the outer rotary part is connected with the second stabilizer part, rotating in unison therewith, and the connection, rotating in unison, between the outer rotary part and the second stabilizer part is established by means of teeth between the outer rotary part and the second stabilizer part. The teeth between the outer rotary part and the second stabilizer part are designed as clearance-free teeth and are welded together by a circumferential weld seam. The weld seam is designed such that it closes the inner working spaces toward the outside in a pressure-sealed manner and axially secures the second stabilizer part in relation to the outer rotary part.

The outer rotary part may have a closing cover with a through hole, in which the inner teeth are provided. The second stabilizer part may be provided with a front-side pin, which pin carries the outer teeth, and the through hole and the pin may form an annular space, which accommodates the weld seam in the area of the teeth, wherein the weld seam is designed as a fillet weld.

According to another aspect of the invention, a process is provided for establishing a toothed connection of the outer rotary part of the actuator with the second stabilizer part, wherein the rotary part consists essentially of a case-hardened steel and the stabilizer part of a spring steel. The inner teeth of the outer rotary part and the outer teeth of the second stabilizer part are made clearance-free in relation to one another. The teeth are welded by a circumferential weld seam between the outer rotary part and the second stabilizer part.

The outer rotary part and the second stabilizer part may be preheated to a temperature of 350° C. for 15 sec in the seam area and cooled after welding to a martensite content of 30% in the microstructure. The preheating may be performed by induction annealing and the welding may be performed under protective gas, wherein a welding rod feed of 11 cm/minute and a welding rate of 9 mm/sec are selected.

The novel two-part stabilizer and the novel process for establishing the connection of the outer rotary part to the corresponding stabilizer part eliminates the drawbacks of the state of the art.

Thus, the novel connection is characterized by high load-bearing capacity, which is due primarily to the teeth manufactured in such a way as to eliminate clearance. This load-bearing capacity is further increased by the circumferential weld seam, because the weld seam also assumes a load-bearing function to a limited extent. The absence of clearance of the teeth is so substantial or complete that the weld seam does not assume the torque transmission alone during any phase of its function. As a result, the requirements imposed on the strength of the weld seam can be kept low.

The circumferential weld seam thus designed has the advantage that it seals the teeth so hermetically that no pressurized medium can escape from the inner working chambers to be outside. The conventional sealing elements between the closing cover of the outer rotary part and the stabilizer part in question become unnecessary due to this sealing function, which leads to considerable cost savings. Furthermore, this weld seam secures the stabilizer part in relation to the closing cover of the outer rotary part against axial load. The radial pinning, which is otherwise necessary, and the difficult manufacture of the pin can thus be done away with, which likewise leads to cost savings. Moreover, weakening of the material due to the pinning in the closing cover and in the stabilizer part is avoided, which has a favorable effect on the load-bearing capacity of the connection.

It is particularly advantageous for the weld seam to be formed in an inner annular space. This is favorable in terms of the manufacturing technology and makes the weld seam invisible, so that it does not need to be subjected to cosmetic finishing.

Using non-weldable or only conditionally weldable materials, it is necessary, in order to avoid cracking, to perform a specific preheating and a defined cooling. It is advantageous in this connection to perform the preheating by induction annealing, because only a very limited area is thus heated, and to subsequently weld under protective gas, because this is a simple and inexpensive method.

The present invention shall be explained in greater detail on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
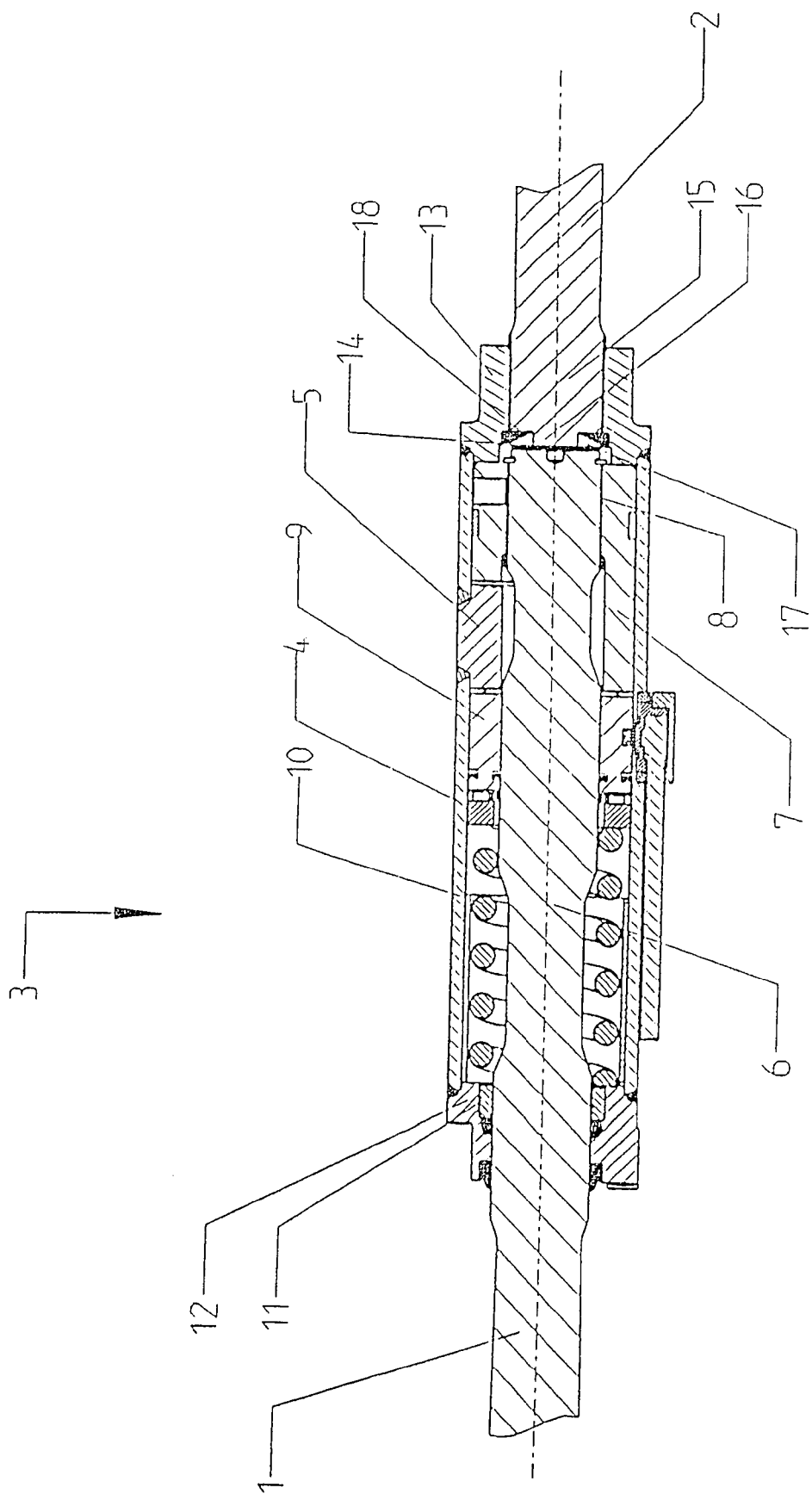
FIG. 1 is a sectional view of an actuator designed as a rotatable clutch.
Figure 2:
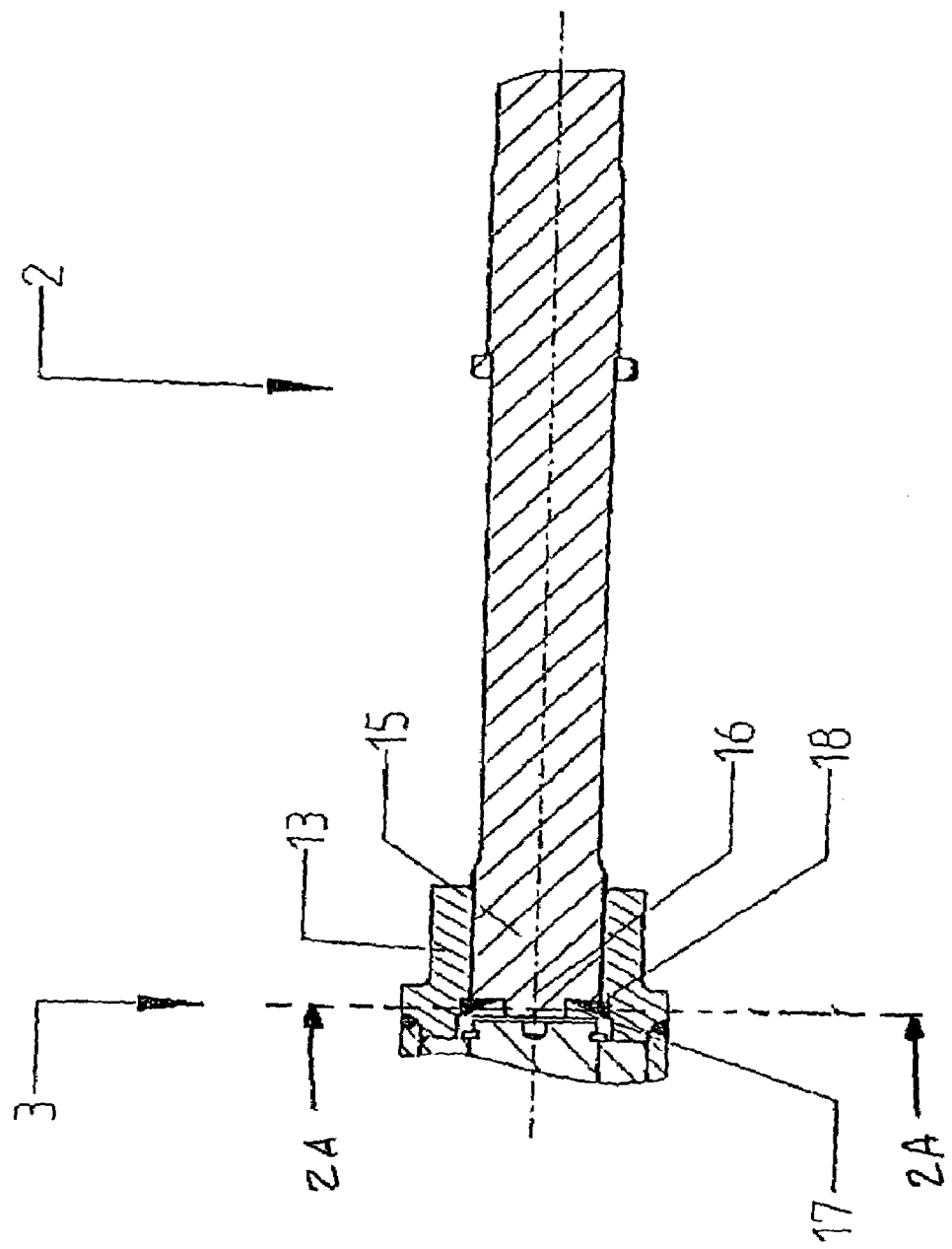
FIG. 2 is a rotatable clutch with an enlarged view of the second stabilizer part.
Figure 2A:
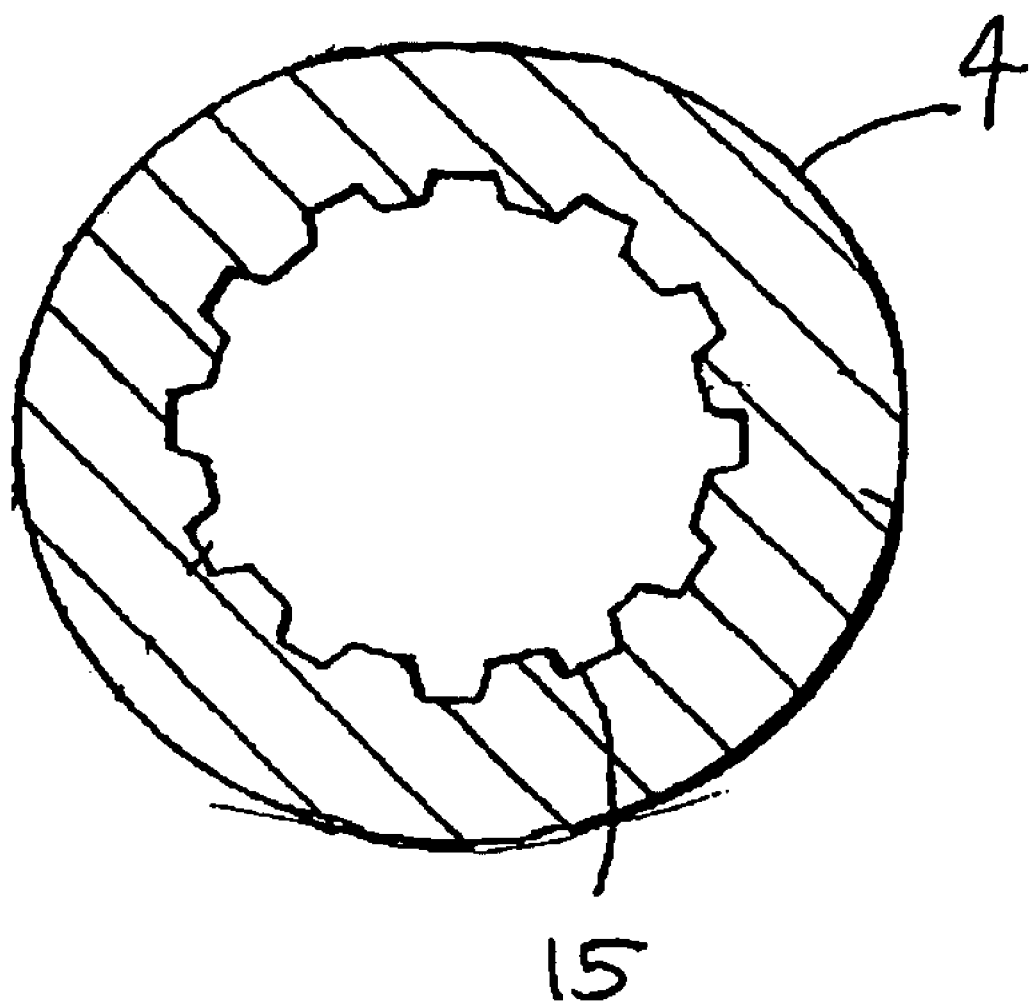
FIG. 2A is a cross-sectional view of the second stabilizer part along the 2A—2A plane of FIG. 2 without the closing cover.

Referring to the drawings in particular, the two FIGS. 1 and 2 show a split stabilizer comprising a first stabilizer part 1 and a second stabilizer part 2, the two being connected to one another via a clutch generally designated 3. The clutch 3 comprises an outer rotary part 4 in the form of a cylindrical housing with a rotary wing 5, which is rotating in unison and is directed inwardly, and with an inner rotary part 6 with an outwardly directed rotary wing 7. The inner rotary part 6 and its outwardly directed rotary wing 7 are connected to one another, rotating in unison, by means of teeth 8. Both rotary wings 5 and 7 are located on a common radial plane and form between them two opposite coupling spaces. A coupling sleeve 9 is guided on the inner rotary part 6 with two conical coupling claws in an axially displaceable manner, the coupling claws engaging the two free coupling spaces of the rotary wings 5 and 7. The coupling sleeve 9 is acted on by the force of a compression spring 10 on one side and alternatingly by the hydraulic pressure of a hydraulic unit, not shown, on both sides. Thus, a positive-locking connection is established between the rotary wings 5 and 7 and the two coupling claws of the coupling sleeve 9 under the force of the compression spring 10 and the hydraulic pressure acting in the same direction, and a connection, rotating in unison, is thus established between the outer rotary part 4 and the inner rotary part 6. This positive-locking connection and consequently the connection rotating in unison is interrupted when a pressure directed in the opposite direction acts on the coupling sleeve 9, so that the rotary wings 5 and 7 are rotatable in relation to one another to a limited extent.

The inner rotary part 6 is made in one piece with the first stabilizer part 1 and is passed with its free end through the housing of the outer rotary part 4 up to the level of the second stabilizer part 2 and is mounted there. In addition, the inner rotary part 6 has another mounting point 11 in a bearing cover 12, which is located on the side of the first stabilizer part 1 and which additionally closes the hydraulic pressure space on this side and seals it toward the outside.

On the side of the second stabilizer part 2, the outer rotary part 4 is equipped with a closing cover 13, which is preferably welded to the housing of the outer rotary part 4 and closes the hydraulic pressure chamber on this side. This closing cover 13 has a through hole 14 with inner teeth. On the other side, the end of the second stabilizer part 2 is designed as a shaft 15, which carries external teeth, the through hole 14 and the shaft 15 being coordinated with one another such that the teeth have hardly any clearance. These teeth have, moreover, such a strength and load-bearing capacity that alone is sufficient for transmitting the torque that becomes established. The shaft 15 of the second stabilizer part 2 is reduced in diameter and thus forms a pin 16, which is axially supported at the inner rotary part 6 and forms an annular space 17 in cooperation with the through hole 14 of the closing cover 13. In particular, there is a circumferential weld seam 18 in this annular space 17, which said weld seam welds the teeth between the closing cover 13 and the shaft 15. This weld seam 18 is shaped and designed such that it assumes a sealing function toward the outside for the hydraulic pressure space located on this side and likewise an axial securing function for the second stabilizer part 2 in relation to the outer rotary part 4.

To attain the necessary spring rate, the stabilizer parts 1, 2 are made of a spring steel 55Cr3 and the closing cover 13 is made of a case-hardened steel, 16MnCr5 being preferably used as the case-hardened steel. The spring steel is considered to be nonweldable and the case-hardened steel to be only conditionally weldable. The weld seam 18 with its two different materials is therefore preheated to a temperature of 350° C. for about 15 sec, the preheating being performed by an induction annealing limited locally to the seam area. As a result, a microstructure that is extensively identical to that of the parent metal will become established in all materials involved. The two parts are subsequently welded together under protective gas, the feed of the welding rod being selected to be 11 cm/minute and the rate of welding being selected to be 9 mm/sec. The material is then cooled slowly over a period of at least 109 sec until the martensite content in the microstructure has dropped to about 30%.

While a specific embodiment of the invention has been shown and described in detail to illustrate the application of the principles of the invention, it will be understood that the invention may be embodied otherwise without departing from such principles.

What is claimed is:

1. A split stabilizer, comprising:
a first stabilizer part and a second stabilizer part, the two being connected to one another by an actuator, said actuator comprising an inner rotary part with at least one outwardly directed rotary wing and an outer rotary part with an equal number of inwardly directed rotary wings, said outwardly directed rotary wing and inwardly directed rotary wing forming free spaces between and in cooperation with a coupling sleeve form hydraulic pressure spaces, said inner rotary part being connected with said first stabilizer part, rotating in unison therewith and said outer rotary part being connected with said second stabilizer part, rotating in unison therewith, and a connection for rotation in unison between said outer rotary part and said second stabilizer part is established by teeth between said outer rotary part and said second stabilizer part wherein said teeth between said outer rotary part and said second stabilizer part are clearance-free teeth and said outer rotary part and said second stabilizer part are welded together by a circumferential weld seam with said weld seam closing inner working spaces of said actuator toward the outside in a pressure-sealed manner and axially secures said second stabilizer part in relation to said outer rotary part, said weld seam sealing said teeth.

2. A split stabilizer in accordance with claim 1, wherein said outer rotary part has a closing cover with a through hole in which inner teeth are provided, and said second stabilizer part is provided with a front-side pin which pin carries outer teeth, and said through hole and said pin form an annular space which accommodates said weld seam in an area of said teeth, wherein said weld seam is a fillet weld.

3. A split stabilizer according to claim 2, wherein said weld seam welds said teeth between said closing cover and said shaft.

4. A split stabilizer according to claim 1, wherein said teeth include inner teeth and outer teeth and said outer rotary part has a closing cover with a through hole in which said inner teeth are provided, said second stabilizer part has a shaft, which shaft carries said outer teeth, and said weld seam welds said teeth between said closing cover and said shaft.

5. A split stabilizer according to claim 4, wherein said shaft of said second stabilizer part is reduced in diameter and forms a pin, said pin being axially supported at said inner rotary part and forms an annular space in cooperation with said through hole.

6. A split stabilizer according to claim 5, wherein said weld seam is arranged in said annular space.

7. A split stabilizer according to claim 6, wherein said coupling sleeve is acted on by a force of a compression spring on one side.

8. A split stabilizer according to claim 4, wherein said first and second stabilizer parts are made of a spring steel and said closing cover is made of casehardened steel.

9. A process for connecting a first stabilizer part with a second stabilizer part by an actuator having an inner rotary part and an outer rotary part, the process comprising:
establishing a toothed connection of said outer rotary part of said actuator with said second stabilizer part wherein said outer rotary part consists of a case-hardened steel and said first stabilizer part of a spring steel and wherein inner teeth of said outer rotary part and outer teeth of said second stabilizer part are made clearance-free in relation to one another, and said teeth are welded by a circumferential weld seam between said outer rotary part and said second stabilizer part, said inner rotary part having at least one outwardly directed rotary wing and said outer rotary part having an equal number of inwardly directed rotary wings; and
forming hydraulic pressure spaces by forming free spaces between said outwardly directed rotary wing and said inwardly directed rotary wing and cooperating with a coupling sleeve, wherein said weld seam seals said teeth and closes inner working spaces of said actuator toward the outside in a pressure-sealed manner and axially secures said second stabilizer part in relation to said outer rotary part.

10. A process in accordance with claim 9, wherein said outer rotary part and said second stabilizer part are preheated to a temperature of 350° C. for 15 sec in a seam area and are cooled after welding to a martensite content of 30% in the microstructure.

11. A process in accordance with claim 10, wherein said preheating is performed by induction annealing and the welding is performed under protective gas, wherein a welding rod feed of 11 cm/minute and a welding rate of 9 mm/sec are selected.

12. A split stabilizer comprising:
a first stabilizer part having a distal end defining an inner rotary part with an outwardly directed rotary wing to rotate in unison therewith;
a second stabilizer part;
a coupling sleeve formed around a predetermined perimeter of said inner rotary part;
an actuator connecting said first stabilizer part with said second stabilizer part, said actuator including said inner rotary part and an outer rotary part connected to said second stabilizer part by a connection means to rotate in unison therewith and having an inwardly directed rotary wing, said outwardly directed rotary wing, said inwardly directed rotary wing, and said coupling sleeve defining a free space forming a hydraulic pressure space, wherein said connection means is established by a clearance free hold between a set of inner teeth of said outer rotary part and a set of outer teeth of said second stabilizer part and said outer rotary part and said second stabilizer part are welded together by a circumferential weld seam with said weld seam closing inner working spaces of said actuator toward the outside in a pressure-sealed manner and axially secures said second stabilizer part in relation to said outer rotary part, said weld seam sealing said inner and outer teeth.

13. A split stabilizer according to claim 12, wherein said outer rotary part has a closing cover with a through hole in which said inner teeth are provided, and said second stabilizer part is provided with a front-side pin which pin carries said outer teeth, and said through hole and said pin form an annular space which accommodates said weld seam in an area of the teeth, wherein said weld seam is a fillet weld.

14. A split stabilizer according to claim 13, wherein said weld seam welds said teeth between said closing cover and said shaft.

* * * * *